Figure 1:
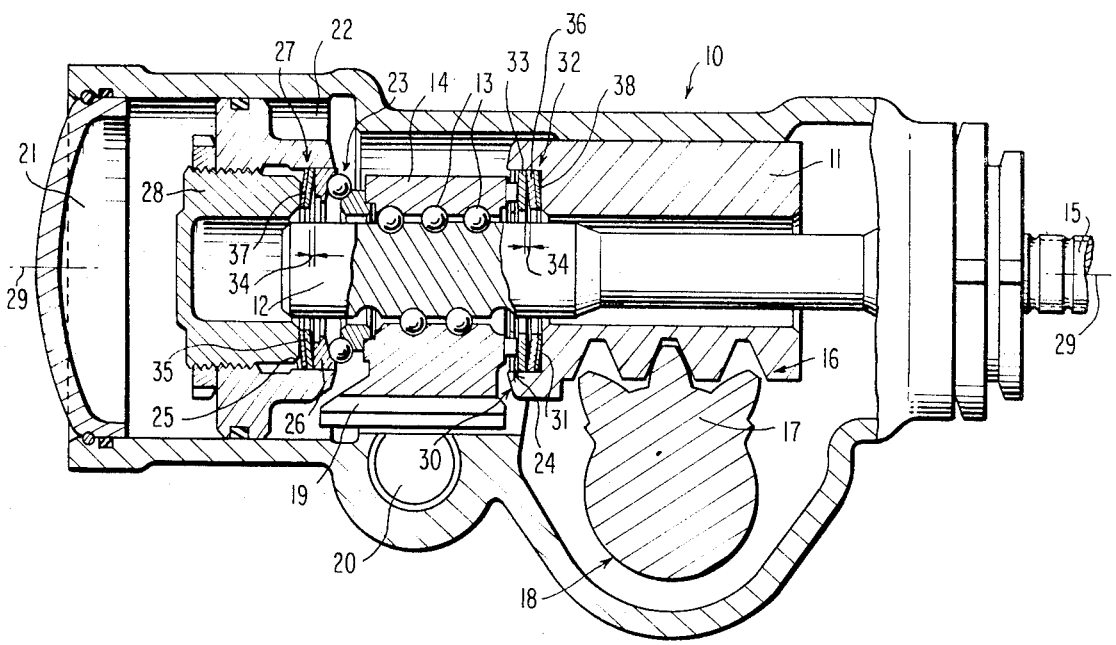

United States Patent [19]

Forster et al.

[11] 3,771,383
[45] Nov. 13, 1973

[54] SERVO STEERING MECHANISM FOR VEHICLES

[75] Inventors: Hans-Joachim M. Forster; Klaus Katz; Manfred Bulow, all of Stuttgart; Anton Scheuter, Aichschiess; Jaromir Bordovsky, Leutenbach; Gerhard Wuchter, Neuhausen, all of Germany

[73] Assignee: Daimler-Benz Aktiengesellschaft, Stuttgart-Unterturkheim, Germany

[22] Filed: Dec. 3, 1971

[21] Appl. No.: 204,628

[30] Foreign Application Priority Data
Dec. 5, 1970  Germany............... P 20 60 029.7

[52] U.S. Cl. ................................................. 74/499
[51] Int. Cl. ............................................. B62d 3/08

[58] Field of Search.................... 74/498, 499, 500, 74/497; 92/136; 91/380, 466

[56] References Cited
UNITED STATES PATENTS
2,144,489   1/1939   Gieskieng ........................... 74/500
3,476,203   11/1969  Forster et al. .................... 91/380 X Primary Examiner—Milton Kaufman
Attorney—Craig, Antonelli & Hill

[57] ABSTRACT

A servo-steering mechanism for vehicles in which a steering nut spirally movably connected with the steering worm is rotatably supported in the working piston connected with the steering shaft while the steering nut is supported with respect to the working piston in both axial directions of the piston axis by way of compression springs, preferably cup spring pairs.

16 Claims, 2 Drawing Figures

SERVO STEERING MECHANISM FOR VEHICLES

The present invention relates to a servo-steering mechanism for vehicles, in which the steering nut helically movably connected with the steering worm is rotatably supported in the working piston drivingly connected wtih the steering shaft.

The aim underlying the present invention essentially consists in dampening in a servo-steering mechanism of this type shocks introduced from the road into the steering gear by way of the steering shaft. The underlying problems are solved according to the present invention in that the steering nut is stopported with respect to the working piston in both directions of the piston axis by way of compression springs. The working piston is thereby able to carry out small axial relative movements with respect to the steering nut so that the impacts and shocks do not become effective on the steering hand wheel coupled to the steering worm. If the steering nut is equipped in a conventional manner with a control arm for the actuation of the control slide valve for the control of the working pressure in the working pressure spaces on both sides of the working piston, then a larger time interval for the build-up of the counter pressure at the working piston counteracting the respective road impact results by reason of the movability of the working piston in accordance with the present invention with respect to the steering nut.

It is desirable with the servo-steering mechanism of the present invention that in the axial neutral position between working piston and steering nut, the friction resulting from the bearing pre-stress in the axial bearing of the steering nut remains small. However, with the axial movement of the working piston with respect to the steering nut, caused by the shock or impact, the essentially non-loaded axial bearing of the steering nut which is disposed opposite the impact direction, must remain under spring-prestress in order that its cage does not leave its intended position. Furthermore, it is necessary that the spring forces of the compression springs respectively stressed by an impact increase steeply over the relative displacement path of the working piston in order that the steering does not become spongy.

According to the present invention, these requirements are achieved by at least two compression springs with different spring constants supporting the steering nut in one direction, of which in the axial neutral position between steering nut and working piston, the pressure spring with the higher spring constant is essentially stress-free and at least one pressure spring with a lower spring constant is under pre-stress. With this arrangement, the weaker compression springs with the flatter characteristics supply the bearing pre-stress so that the stronger compression springs can be substantially stress-free in the neutral position. As a result thereof, the bearing friction remains small. Due to the flat characteristics of the weaker compression spring, the axial bearing of the steering nut, which is not under shock or impact load, can still be kept under pre-stress even with the deflection of the working piston taking place under the shock or impact.

A space-saving accommodation of the spring means is achieved according to a further feature of the present invention in that at least one bearing of the steering nut is arranged in series with at least one compression spring.

Accordingly, it is an object of the present invention to provide a servo-steering system for vehicles which avoids by simple means the aforementioned shortcomings and drawbacks encountered in the prior art.

Another object of the present invention is a servo-steering mechanism for motor vehicles which effectively dampens shocks and impacts introduced from the road surface into the steering gear by way of the steering shaft.

A further object of the present invention resides in a servo-steering mechanism for motor vehicles in which the steering wheel is substantially isolated from road shocks introduced into the steering system from the road surface.

A further object of the present invention resides in a servo-steering mechanism for vehicles in which a larger time interval is made available for the build-up of the counter-pressure at the working piston which counteracts the road shocks.

A still further object of the present invention resides in a servo-steering system in which the friction in the axial bearing of the steering nut is kept small, notwithstanding the existence of a certain bearing pre-stress under all conditions.

Another object of the present invention resides in a servo-steering mechanism which permits a space-saving accommodation and mounting of the spring means and which results in a compact construction of the steering gear.

Figure 2:
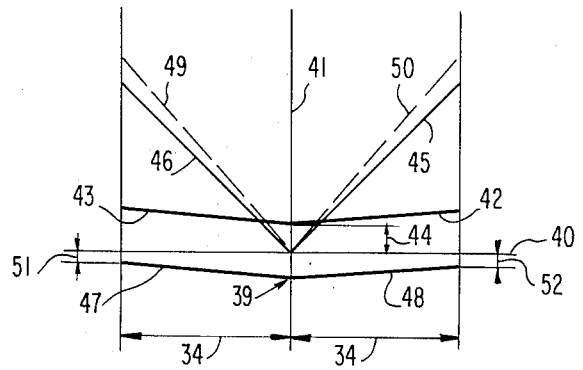

These and further objects, features and advantages of the present invention will become more apparent from the following description when taken in connection with the accompanying drawing, which shows, for purposes of illustration only, one embodiment in accordance with the present invention, and wherein:

FIG. 1 is a longitudinal cross-sectional view through a steering gear housing in accordance with the present invention; and FIG. 2 is a diagram illustrating the spring forces in the arrangement of FIG. 1.

Referring now to the drawing, and more particularly to FIG. 1, a working piston 11 is displaceably guided in the steering gear housing generally designated by reference numeral 10 and constructed as pressure medium cylinder. A steering nut 14 which is spirally movably connected with the steering worm 12 by way of a ball circulation 13 of conventional type is rotatably supported in the working piston 11. The steering worm 12 is provided at its outer end with a coupling pin 15, to which the steering hand wheel can be coupled. The working piston 11 is provided with a toothed rack profile 16 into which engages a toothed segment 17 of the steering shaft 18 coupled with the steering linkage (not shown). The steering nut 14 is additionally provided with a control arm 19 which actuates a control slide valve 20 in a conventional manner; the working pressure in the working pressure spaces 21 and 22 disposed on the two sides of the working piston 11 is controlled by means of the control valve 20. Since the control valve 20 is of conventional construction, forming no part of the present invention, a detailed description thereof is dispensed with herein. At one end, the steering nut 14 is supported in the working piston 11 by means of an inclined ball bearing generally designated by reference numeral 23 and at the other end it is supported in the working piston 11 by way of an axial roller bearing generally designated by reference numeral 24.

The bearing race 26 of the bearing 23 wich is disposed on the outside with respect to the steering nut 14 and is displaceably centered in a coaxial bearing bore 25, is axially supported against a pair of cup springs generally designated by reference numeral 27; the cup spring pair 27 cooperates with an adjusting sleeve 28 screwed into the bearing bore 25 as abutment. The central section of the bearing bore 25 of the working piston 11 is traversed by an aperture generally designated by reference numeral 30 and extending perpendicularly to the piston and steering worm axis 29 for the assembly and installation of the steering nut 14. At the inner end of the bearing bore 25, a radial shoulder 31 of the working piston 11 serves as abutment for a cup spring pair generally designated by reference numeral 32, at which is supported the rotating disk 33 of the bearing 24 displaceably centered in the bore 25. The adjusting bushing 28 is so adjusted that the working piston 11 in the illustrated neutral position with respect to the steering nut has a predetermined axial play 34 in both directions of the axis 29.

The cup spring pairs 27 and 32 consist each of one inner thick cup spring 35 and 36 with a greater spring constant and of one outer thin cup spring 37 and 38 with a lower spring constant, respectively.

In FIG. 2, the play 34 is indicated on an enlarged scale along the abscissa 40 on both sides of the neutral position indicated by reference numeral 39 between working piston 11 and steering nut 14. The ordinate represents the variable spring force.

The flat curves 42 and 43 indicate the characteristics of the spring force for the thin cup springs 37 and 38. As can be seen from FIG. 2, these cup springs 37 and 38 are prestressed in the neutral position 39 with the force 44 whereas it can be seen from the curves 45 and 46 for the force characteristics of the thick cup springs 35 and 36 that the latter are stress-free in the position 39 of the working piston 11.

The curve 47 and 48 represents the respective assisting effect of the cup springs 37 and 38 during the impact displacement of the working piston 11 with respect to the steering nut 14.

From the algebraic addition of the curves 43, 46 and 47 and of the curves 42, 45 and 48 results the configuration of the curve 49 and 50 for the required external force for the relative displacement between working piston and steering nut.

The ordinate values 51 and 52 of the curve 47 and 48 illustrate that the cup spring 37 or 38 which is not loaded by a respective shock or impact, remains under a residual stress when the parts 11 and 14 are deflected with respect to one another by the play 34 so that the associated bearing cage cannot leave its intended position.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A servo-steering mechanism for vehicles, in which a steering nut means spirally movably connected with a steering worm means is supported so as to be movable in the rotary direction within a working piston means operatively connected with a steering shaft, said steering nut means being supported in both directions of the piston axis by way of compression spring means with respect to the working piston means, characterized by at least two compression spring means supporting the steering nut means in a given direction which possess differing spring constants, of which in the axial neutral position between steering nut means and working piston means the compression spring means with the higher spring constant is substantially stress-free and at least one compression spring means with lower spring constant is under prestress.

2. A servo-steering system according to claim 1, characterized in that the compression spring means are pairs of cup springs.

3. A servo-steering system according to claim 1, characterized in that at least one bearing means of the steering nut means is arranged in series with a compression spring means.

4. A servo-steering system according to claim 3, characterized in that the steering nut means is supported in the piston means by bearing means including an inclined ball bearing and an axial roller bearing, of which is least one bearing means is arranged in series with respective compression spring means.

5. A servo-steering system according to claim 4, characterized in that both bearing means are arranged in series with respect compression spring means.

6. A servo-steering system according to claim 5, characterized in that the compression spring means consist of pairs of cup springs.

7. A servo-steering system according to claim 1, characterized in that the steering nut means is supported in the piston means by bearing means including an inclined ball bearing and an axial roller bearing of which at least one bearing means is arranged in series with respective compression spring means.

8. A servo-steering system according to claim 7, characterized in that both bearing means are arranged in series with respect compression spring means.

9. A servo-steering system according to claim 7, characterized in that the compression spring means consist of pairs of cup springs.

10. A servo-steering mechanism for vehicles, in which a steering nut means spirally movably connected with a steering worm means is supported so as to be movable in the rotary direction within a working piston means operatively connected with a steering shaft, wherein the steering nut means is supported in at least one direction of the piston axis by way of resilient means with respect to the working piston means, and wherein said resilient means exhibits a variable effective spring constant which is dependent on the distance said steering nut means is from a neutral central position with respect to said working piston means.

11. A servo-steering mechanism according to claim 10 wherein said resilient means resiliently opposes movement of said steering nut means from said neutral central position, and wherein said spring constant is smaller for movement close to said neutral central position than for movement further from said neutral position.

12. A servo-steering mechanism according to claim 10, wherein said resilient means supports said steering nut means in both directions of the piston axis.

13. A servo-steering mechanism according to claim 12, wherein said resilient means resiliently opposes movement of said steering nut means from said neutral central position, and wherein said spring constant is smaller for movement close to said neutral central position than for movement further from said neutral central position.

14. A servo-steering mechanism according to claim 13, wherein said resilient means includes at least two spring means supporting the steering nut means in a given direction which possess different spring constants, the spring means with the lower spring constant being under prestress and the spring means with the higher spring constant being stress-free when the steering nut means is in said neutral central position.

15. A servo-steering mechanism according to claim 14, wherein said spring means are compression springs.

16. A servo-steering mechanism according to claim 15, wherein said spring means are cup springs.

\* \* \* \* \*